(12) United States Patent
Smith et al.

(10) Patent No.: US 11,913,819 B2
(45) Date of Patent: Feb. 27, 2024

(54) ELECTROMAGNETIC INTERFERENCE RESISTANT ELECTRONICS ENCLOSURE WITH AN INTERCOMPARTMENT CONDUCTIVE GASKET

(71) Applicant: MICRO MOTION, INC., Boulder, CO (US)

(72) Inventors: Brian T. Smith, Johnstown, CO (US); Clayton T. James, Longmont, CO (US)

(73) Assignee: MICRO MOTION, INC., Boulder, CO (US)

( * ) Notice: Subject to any disclaimer, the term of this patent is extended or adjusted under 35 U.S.C. 154(b) by 478 days.

(21) Appl. No.: 17/265,966

(22) PCT Filed: Aug. 16, 2018

(86) PCT No.: PCT/US2018/046799
§ 371 (c)(1),
(2) Date: Feb. 4, 2021

(87) PCT Pub. No.: WO2020/036597
PCT Pub. Date: Feb. 20, 2020

(65) Prior Publication Data
US 2021/0381873 A1    Dec. 9, 2021

(51) Int. Cl.
*G01N 9/00* (2006.01)
*G01F 15/00* (2006.01)
(Continued)

(52) U.S. Cl.
CPC ............ *G01F 15/14* (2013.01); *G01F 1/8422* (2013.01); *G01F 1/8427* (2013.01);
(Continued)

(58) Field of Classification Search
CPC ...... G01F 15/14; G01F 1/8422; G01F 1/8427; G01F 1/8436; G01F 1/8477;
(Continued)

(56) References Cited

U.S. PATENT DOCUMENTS 10,784,016 B2    9/2020   Tokumoto et al.
2001/0043126 A1  11/2001  Cherniski et al.
(Continued)

FOREIGN PATENT DOCUMENTS

WO    WO-2020032946 A1 *  2/2020  ........... G01F 1/8409

*Primary Examiner* — Brandi N Hopkins
(74) *Attorney, Agent, or Firm* — The Ollila Law Group LLC (57) ABSTRACT

An EMI resistant electronics enclosure (200) is provided having a first compartment (206) and a second compartment (207), each defined by a body (205), being separated by a septum (208). A first aperture (209) in the septum (208) connects the first compartment (206) and the second compartment (207). A feed-through element (210) is provided having a first interface region (211) and a second interface region (212), wherein one or more primary conductors (217) extend between the first interface region (211) and the second interface region (212), and wherein the first interface region (211) resides in the first compartment (206), and the second interface region (212) resides in the second compartment (207). A conductive bar (232) circumscribes at least a portion of the feed-through element (210), and a conductive gasket (220) extends from the body (205) to the conductive bar (232), wherein a ground path is formed between the body (205) and the conductive bar (232) with the conductive gasket (220).

13 Claims, 7 Drawing Sheets

(51) Int. Cl.
  *G01F 1/84*   (2006.01)
  *G01F 15/14*   (2006.01)

(52) U.S. Cl.
  CPC .......... *G01F 1/8436* (2013.01); *G01F 1/8477* (2013.01); *G01N 9/002* (2013.01); *G01N 2009/006* (2013.01)

(58) Field of Classification Search
  CPC .......... G01F 1/8409; G01F 1/662; G01F 1/84; G01F 15/18; G01N 9/002; G01N 2009/006; G01N 30/88; G01N 2030/25; G01D 11/24; H05K 9/00; G16H 20/13; H01R 13/658
  See application file for complete search history.

(56) References Cited

U.S. PATENT DOCUMENTS

| | | | |
|---|---|---|---|
| 2007/0138602 A1 | 6/2007 | Orth et al. | |
| 2015/0129300 A1* | 5/2015 | Mansfield | H01R 43/005 29/829 |
| 2016/0183416 A1 | 6/2016 | Baecklund | |

* cited by examiner

ELECTROMAGNETIC INTERFERENCE RESISTANT ELECTRONICS ENCLOSURE WITH AN INTERCOMPARTMENT CONDUCTIVE GASKET

BACKGROUND OF THE INVENTION

1. Field of the Invention

The present invention relates to electronics housings, and more particularly, to an electronics enclosure having electromagnetic interference resistance.

2. Statement of the Problem

Electronics enclosures that house sensitive electronics may be susceptible to electromagnetic interference (EMI). EMI is the process by which radiated or conducted energy is transmitted to another device and can cause performance and measurement deviations. This interference is in the form of radiated energy from natural (lightning for example) or man-made (equipment, motors, broadcast antennae, etc). All electronics products must meet a minimum standard of EMC (Electromagnetic Compatibility) that allows them to operate, under the influence of EMI, without affecting primary equipment functions. To attenuate the effects of EMI, some form of shielding is generally required. Some scheme to absorb and/or reflect EMI energy may be employed both to confine the EMI energy within a source device, and to insulate that device from EMI sources. A circuit, completely surrounded by a metal enclosure without openings, is shielded from EMI. However, this is generally not a practical solution since the circuit must interface with the outside world.

Typically, shielding is provided that is located between the EMI source and the electronics, and is usually constructed such that an electrically conductive and grounded housing encloses the device, yet provides apertures to allow external interfacing. These apertures typically take the form of small holes, doors, panels, etc. When apertures are present, however, the shield is interrupted and EMI energy can enter the enclosure via conduction (on the wires) or radiation (energy propagated through the opening). The amount of interference is based on the aperture size and the radiated frequency. The size of the opening and susceptibility to external interference is related to the external signal wavelength.

$$\Xi = c/f \quad (1)$$

where:
$\Xi$ is the wavelength;
c is the speed of light; and
f is the frequency.

Thus, higher frequencies result in small wavelengths, and even very small apertures in a shield allow entry of high frequencies. Such apertures are effectively shielding disruptions that may even operate as a form of slot antenna to provide a secondary source of EMI radiation. In such cases, the amplitude of the noise is roughly proportional to the length of the aperture.

There are a number of standard practices to control EMI related to the presence of apertures, however all have drawbacks. For example, cable may be shielded such that wires are wrapped with conductive material. Unfortunately, wire shielding is often user-dependent, and requires that a customer install the needed wire shielding to maintain the shield integrity. This is not controllable by a device manufacturer. In another example, wires may be enclosed in another "metal extension" that protrudes from an enclosure and maintains the wires inside a continuous shield. These tend to be extremely expensive and add additional installation costs. Lastly, apertures may be controlled in size to eliminate certain frequencies. This, however, is not always possible based upon the size and dimension of the housing and its related configuration. Furthermore, products that are used in hazardous areas often require particular spacing considerations that constrain aperture size adjustment.

Some industrial environments have an explosive atmosphere. A spark of sufficient energy in these environments can ignite an explosion. One potential source of these sparks is circuitry used to perform and monitor certain operations in these environments. Some electronic devices, such as industrial measuring instruments for example, may generate an electrostatic discharge or spark during their operation. In dangerous atmospheres, it is important to enclose such circuits in an explosion proof compartment to prevent a spark created inside the compartment from igniting the atmosphere outside of the compartment.

Industrial measuring instruments, such as flowmeters, are often operated in locations in which there is a danger of explosion, i.e., the electronic apparatus is located not in normal air, but in a potentially explosive atmosphere. Examples of environments in which potentially explosive atmospheres are present or may arise are refueling facilities, hydrocarbon capture or transfer facilities, or chemical plants, for example.

Such electronic apparatuses that are to be usable in hazardous areas are subject to special safety regulations, which are defined in a number of operational standards. The main objects of those standards are to avoid an electric spark that may initiate an explosion, or to prevent a spark produced inside an enclosed space from causing an explosion outside, or to ensure that a flame that has already developed will be confined to the space in which it has developed. By way of example only, European Standards IEC 60079-1, describe the requirements for electronics devices necessary to be considered an "flameproof enclosure" (Ex-d). Ideally, in the event of a fault or a short circuit, the maximum amount of energy released is not sufficient to produce a spark capable of causing ignition. These are examples of some European standards, and are provided as an example only, but comparable standards exist in the USA, Canada, Japan, and other countries.

In particular, electronic apparatuses designed to meet the requirements of Ex-d protection must be located in a portion of an enclosure that is explosion proof. This prevents an explosion that occurs inside the enclosure from penetrating to the outside or to another compartment, e.g., from the electronics compartment to the terminal compartment.

Flowmeters, such as Coriolis mass flowmeters and vibrating densitometers, typically operate by detecting motion of a vibrating conduit that contains a flowing material. Properties associated with the material in the conduit, such as mass flow, density and the like, can be determined by processing measurement signals received from motion transducers associated with the conduit. The vibration modes of the vibrating material-filled system generally are affected by the combined mass, stiffness and damping characteristics of the containing conduit and the material contained therein.

A typical Coriolis mass flowmeter includes one or more conduits that are connected inline in a pipeline or other transport system and convey material, e.g., fluids, slurries, emulsions, and the like, in the system. Each conduit may be viewed as having a set of natural vibration modes, including for example, simple bending, torsional, radial, and coupled modes. In a typical Coriolis mass flow measurement application, a conduit is excited in one or more vibration modes as a material flows through the conduit, and motion of the conduit is measured at points spaced along the conduit. Excitation is typically provided by an actuator, e.g., an electromechanical device, such as a coil-type driver, that perturbs the conduit in a periodic fashion. Mass flow rate may be determined by measuring time delay or phase differences between motions at the transducer locations. Two such transducers (or pickoff sensors) are typically employed in order to measure a vibrational response of the flow conduit or conduits, and are typically located at positions upstream and downstream of the actuator. The two pickoff sensors are connected to electronic instrumentation. The instrumentation receives signals from the two pickoff sensors and processes the signals in order to derive a mass flow rate measurement, among other things.

For flowmeters, by way of example, an explosion proof physical barrier may separate the compartments of a field-mount transmitter housing. Process control transmitters designed for use in hazardous atmospheres often utilize a combination of protection methods, including explosion proof housings and/or barriers, to avoid uncontrolled explosions of flammable gases. In the case of Coriolis flowmeter transmitters, it is well known to enclose the active electronics components within an explosion proof compartment, so that an explosion of gases that might occur as a result of electrical energy within the electronics will not propagate beyond the enclosure. Furthermore, it is sometimes preferred that user-accessible connection facilities of the electronics utilize "increased safety" rather than explosion proof as a protection method, wherein the connection facilities are shown to be non-sparking and therefore incapable of igniting a flammable gas. Under either standard, active electronics which could cause ignition are contained in a compartment wherein any ignition within the compartment cannot escape the compartment.

An enclosure is therefore provided that provides an EMI shield that utilizes a PCB to transfer the signals in/out of the enclosure. A continuous shield against radiated energy is integrally created with the PCB routed traces. In embodiments, the enclosure maintains a flameproof or explosion proof interface.

SUMMARY

An EMI resistant electronics enclosure is provided according to an embodiment. The EMI resistant electronics comprises a first compartment defined by a body and a second compartment defined by the body. A septum is between the first compartment and the second compartment. A first aperture with the septum connects the first compartment and the second compartment. A feed-through element comprises a first interface region and a second interface region, wherein one or more primary conductors extend between the first interface region and the second interface region, and wherein the first interface region resides in the first compartment, and the second interface region resides in the second compartment. A conductive bar circumscribes at least a portion of the feed-through element, and a conductive gasket extends from the body to the conductive bar, wherein a ground path is formed between the body and the conductive bar with the conductive gasket.

A method of forming an EMI resistant electronics enclosure is provided according to an embodiment. The method comprises providing a body comprising a first compartment and a second compartment, and separating the first compartment and the second compartment with a septum. A first aperture is placed in the septum that connects the first compartment and the second compartment. A feed-through element is inserted through the first aperture and cavity, wherein the feed-through element comprises a first interface region and a second interface region, wherein one or more primary conductors extend between the first interface region and the second interface region, and wherein the first interface region resides in the first compartment, and the second interface region resides in the second compartment. A conductive bar is placed around at least a portion of the feed-through element, and a conductive gasket is installed between the body and the conductive bar, to form a conductive path therebetween.

Aspects

According to an aspect, an EMI resistant electronics enclosure comprises a first compartment defined by a body and a second compartment defined by the body. A septum is between the first compartment and the second compartment. A first aperture with the septum connects the first compartment and the second compartment. A feed-through element comprises a first interface region and a second interface region, wherein one or more primary conductors extend between the first interface region and the second interface region, and wherein the first interface region resides in the first compartment, and the second interface region resides in the second compartment. A conductive bar circumscribes at least a portion of the feed-through element, and a conductive gasket extends from the body to the conductive bar, wherein a ground path is formed between the body and the conductive bar with the conductive gasket.

Preferably, the electronics enclosure comprises a flexible member comprising secondary internal conductors that are in electrical communication with the primary conductors, and an EMI shield formed as an outer layer of the flexible member that surrounds the secondary conductors of the flexible member.

Preferably, the feed-through element comprises a printed circuit board.

Preferably, the gasket comprises a conductive fabric.

Preferably, the EMI shield is in electrical contact with the conductive bar.

Preferably, the EMI shield is in electrical contact with a secondary PCB disposed in the second compartment.

Preferably, the secondary PCB comprises a conductive connection point, wherein the conductive connection point is in electrical contact with the EMI shield.

Preferably, the conductive connection point is grounded.

According to an aspect, a method of forming an EMI resistant electronics enclosure comprises providing a body comprising a first compartment and a second compartment, and separating the first compartment and the second compartment with a septum. A first aperture is placed in the septum that connects the first compartment and the second compartment. A feed-through element is inserted through the first aperture and cavity, wherein the feed-through element comprises a first interface region and a second interface region, wherein one or more primary conductors extend between the first interface region and the second interface region, and wherein the first interface region resides in the first compartment, and the second interface region resides in the second compartment. A conductive bar is placed around at least a portion of the feed-through element, and a conductive gasket is installed between the body and the conductive bar, to form a conductive path therebetween.

Preferably, the method comprises electrically connecting secondary internal conductors of a flexible member to the primary conductors, and surrounding the secondary conductors of the flexible member with an EMI shield.

Preferably, the feed-through element comprises a printed circuit board.

Preferably, the gasket comprises a conductive fabric.

Preferably, the method comprises the step of placing the EMI shield in electrical contact with the conductive bar.

Preferably, the method comprises the step of electrically connecting the EMI shield with a secondary PCB disposed in the second compartment.

Preferably, the method comprises the step of placing a conductive connection point of the secondary PCB in electrical contact with the EMI shield.

DESCRIPTION OF THE DRAWINGS

The same reference number represents the same element on all drawings. The drawings are not necessarily to scale.

DETAILED DESCRIPTION

FIGS. 1-8 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
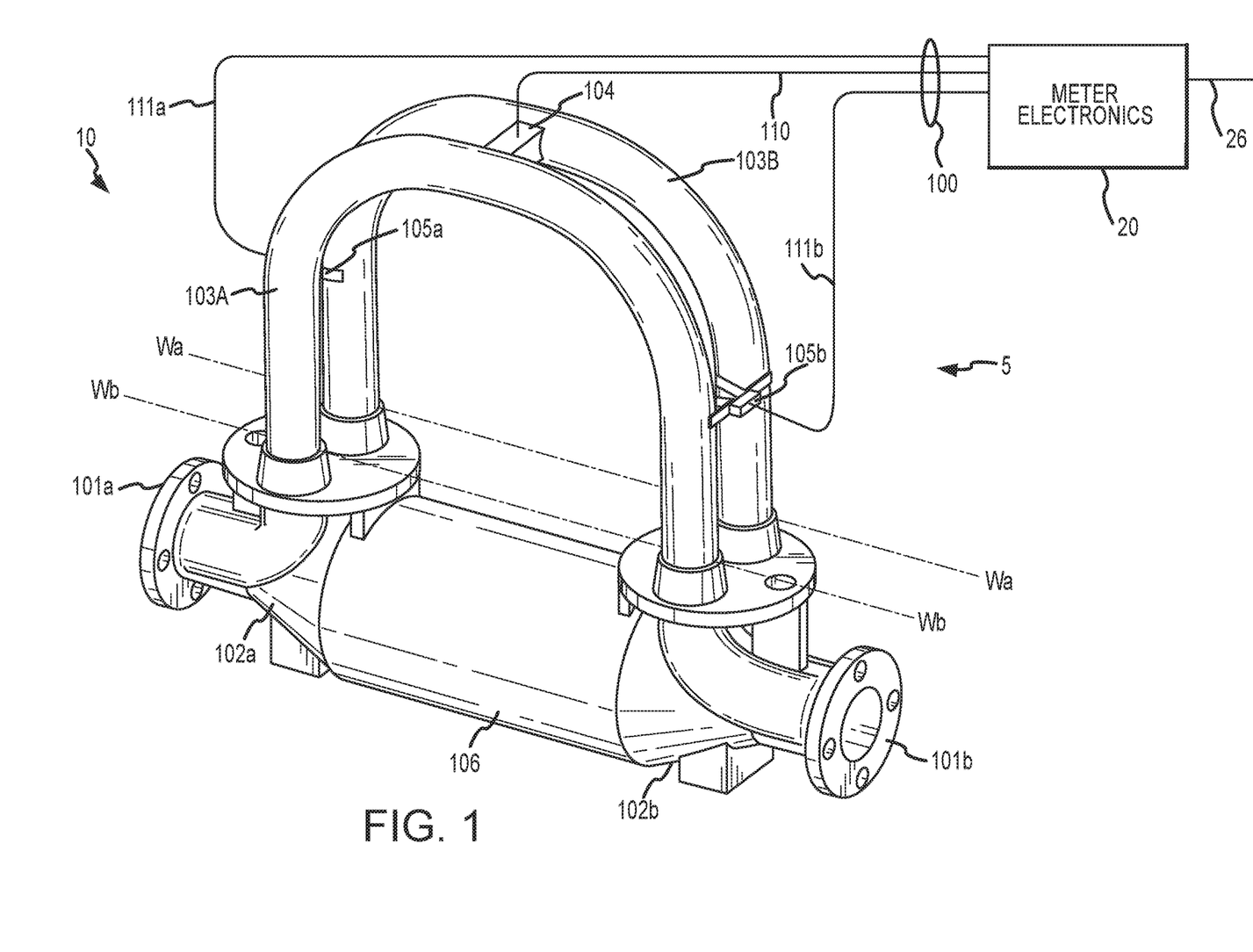
FIG. 1 shows a vibratory flowmeter according to an embodiment of the invention.

FIG. 1 shows a vibratory flowmeter 5 according to the invention. The explosion proof feedthrough described herein is contemplated for use with such a vibratory flowmeter 5. However, this is merely an example of an application for the explosion proof feedthrough, and is in no way limiting, as the explosion proof feedthrough may be utilized with any appropriate device. The vibratory flowmeter 5 comprises a flowmeter assembly 10 and meter electronics 20. The meter electronics 20 is connected to the meter assembly 10 via leads 100 and is configured to provide measurements of one or more of a density, mass flow rate, volume flow rate, totalized mass flow, temperature, or other measurements or information over a communication path 26. It should be apparent to those skilled in the art that the vibratory flowmeter 5 can comprise any manner of vibratory flowmeter, regardless of the number of drivers, pick-off sensors, flow conduits, or the operating mode of vibration. In some embodiments, the vibratory flowmeter 5 can comprise a Coriolis mass flowmeter. In addition, it should be recognized that the vibratory flowmeter 5 can alternatively comprise a vibratory densitometer.

The flowmeter assembly 10 includes a pair of flanges 101a and 101b, manifolds 102a and 102b, a driver 104, pick-off sensors 105a and 105b, and flow conduits 103A and 103B. The driver 104 and the pick-off sensors 105a and 105b are connected to the flow conduits 103A and 103B.

The flanges 101a and 101b are affixed to the manifolds 102a and 102b. The manifolds 102a and 102b can be affixed to opposite ends of a spacer 106 in some embodiments. The spacer 106 maintains the spacing between the manifolds 102a and 102b in order to prevent pipeline forces from being transmitted to flow conduits 103A and 103B. When the flowmeter assembly 10 is inserted into a pipeline (not shown) which carries the flow fluid being measured, the flow fluid enters the flowmeter assembly 10 through the flange 101a, passes through the inlet manifold 102a where the total amount of flow fluid is directed to enter the flow conduits 103A and 103B, flows through the flow conduits 103A and 103B and back into the outlet manifold 102b, where it exits the meter assembly 10 through the flange 101b.

The flow fluid can comprise a liquid. The flow fluid can comprise a gas. The flow fluid can comprise a multi-phase fluid, such as a liquid including entrained gases and/or entrained solids.

The flow conduits 103A and 103B are selected and appropriately mounted to the inlet manifold 102a and to the outlet manifold 102b so as to have substantially the same mass distribution, moments of inertia, and elastic modulus about the bending axes Wa—Wa and Wb—Wb respectively. The flow conduits 103A and 103B extend outwardly from the manifolds 102a and 102b in an essentially parallel fashion.

The flow conduits 103A and 103B are driven by the driver 104 in opposite directions about the respective bending axes Wa and Wb and at what is termed the first out of phase bending mode of the vibratory flowmeter 5. The driver 104 may comprise one of many well known arrangements, such as a magnet mounted to the flow conduit 103A and an opposing coil mounted to flow conduit 103B. An alternating current is passed through the opposing coil to cause both conduits to oscillate. A suitable drive signal is applied by the meter electronics 20 to the driver 104 via the lead 110. Other driver devices are contemplated and are within the scope of the description and claims.

The meter electronics 20 receives sensor signals on the leads 111a and 111b, respectively. The meter electronics 20 produces a drive signal on the lead 110 which causes the driver 104 to oscillate the flow conduits 103A and 103B. Other sensor devices are contemplated and are within the scope of the description and claims.

The meter electronics 20 processes the left and right velocity signals from the pick-off sensors 105a and 105b in order to compute a flow rate, among other things. The communication path 26 provides an input and an output means that allows the meter electronics 20 to interface with an operator or with other electronic systems. The description of FIG. 1 is provided merely as an example of the operation of a Coriolis flowmeter and is not intended to limit the teaching of the present invention.

The meter electronics 20 in one embodiment is configured to vibrate the flowtubes 103A and 103B. The vibration is performed by the driver 104. The meter electronics 20 further receives resulting vibrational signals from the pickoff sensors 105a and 105b. The vibrational signals comprise vibrational responses of the flowtubes 103A and 103B. The meter electronics 20 processes the vibrational responses and determines a response frequency and/or phase difference. The meter electronics 20 processes the vibrational response and determines one or more flow measurements, including a mass flow rate and/or density of the flow fluid. Other vibrational response characteristics and/or flow measurements are contemplated and are within the scope of the description and claims.

In one embodiment, the flowtubes 103A and 103B comprise substantially U-shaped flowtubes, as shown. Alternatively, in other embodiments, the flowtubes can comprise substantially straight flowtubes or can comprise one or more flowtubes of curved shapes other than U-shaped flowtubes. Additional flowmeter shapes and/or configurations can be used and are within the scope of the description and claims.

Figure 2:
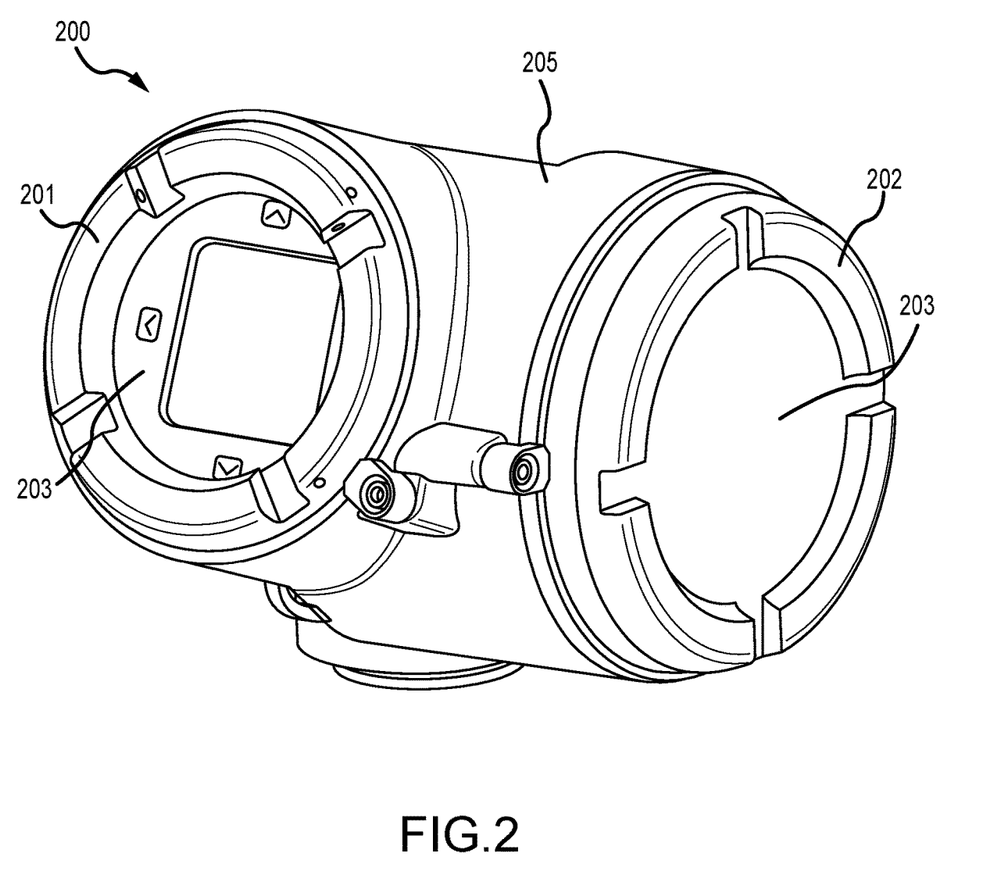
FIG. 2 illustrates an embodiment of an EMI resistant electronics enclosure.

FIG. 2. is a view of an electronics enclosure 200 according to an embodiment of the invention. The electronics enclosure 200 may be installed on a flowmeter 5 for example. It should be clear, however, that the electronics enclosure 200 may be utilized in any application where an electronics enclosure 200 is contemplated. The electronics enclosure 200 comprises a first access point 201 and a second access point 202. These access points 201, 202 provide means to access the interior spaces of the electronics enclosure 200. In an embodiment, the access points 201, 202 may comprise cap members 203 that are secured to the body 205 of the electronics enclosure 200. In an embodiment, at least one of the cap members may be transparent so that interior electronics and/or a display may be visible to a user.

Figure 3:
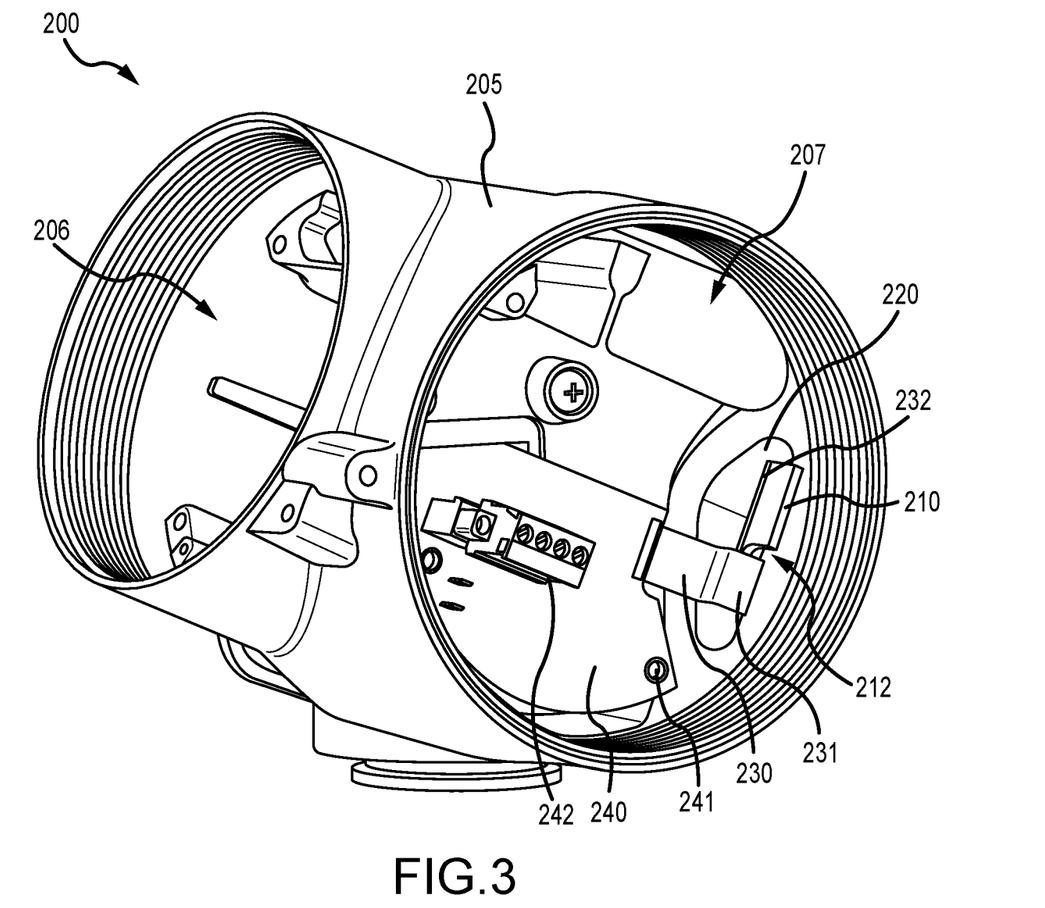
FIG. 3 is an isometric view of the EMI resistant electronics enclosure of FIG. 2 with cap members omitted.
Figure 4:
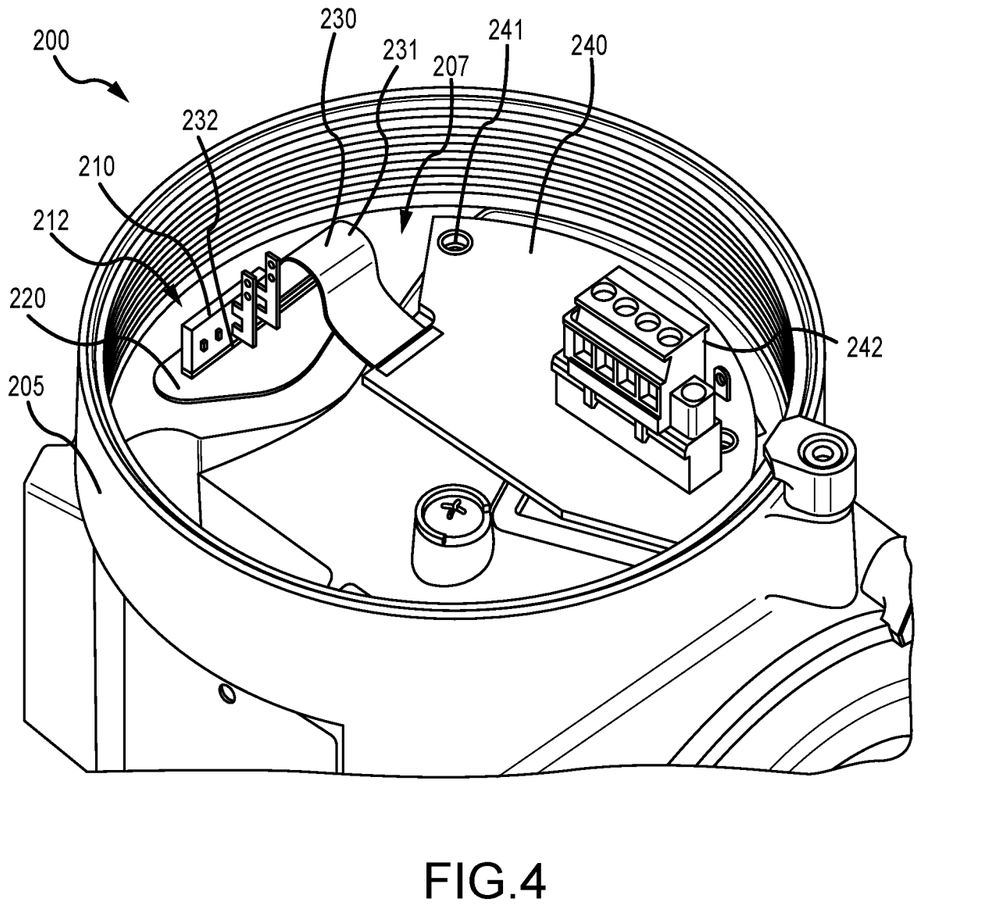
FIGS. 4 and 5 illustrate magnified isometric views of the EMI resistant electronics enclosure of FIGS. 2 and 3.

FIG. 3. is a view of the electronics enclosure 200 with the cap members 203 removed, according to an embodiment of the invention. The electronics enclosure 200 in this embodiment includes a feed-through element 210. In an embodiment, the feed-through element 210 comprises a substantially planar shape, a first interface region 211 (see FIG. 8), and a second interface region 212, wherein one or more primary conductors 217 extend between the first interface region 211 and the second interface region 212.

Turning to FIGS. 3 through 8, the body 205 of the electronics enclosure 200 defines a first compartment 206 and a second compartment 207. In an embodiment, meter electronics 20 or other types of electronics are disposed in the first compartment 206, while terminals and/or interfaces are disposed in the second compartment 207.

Figure 7:
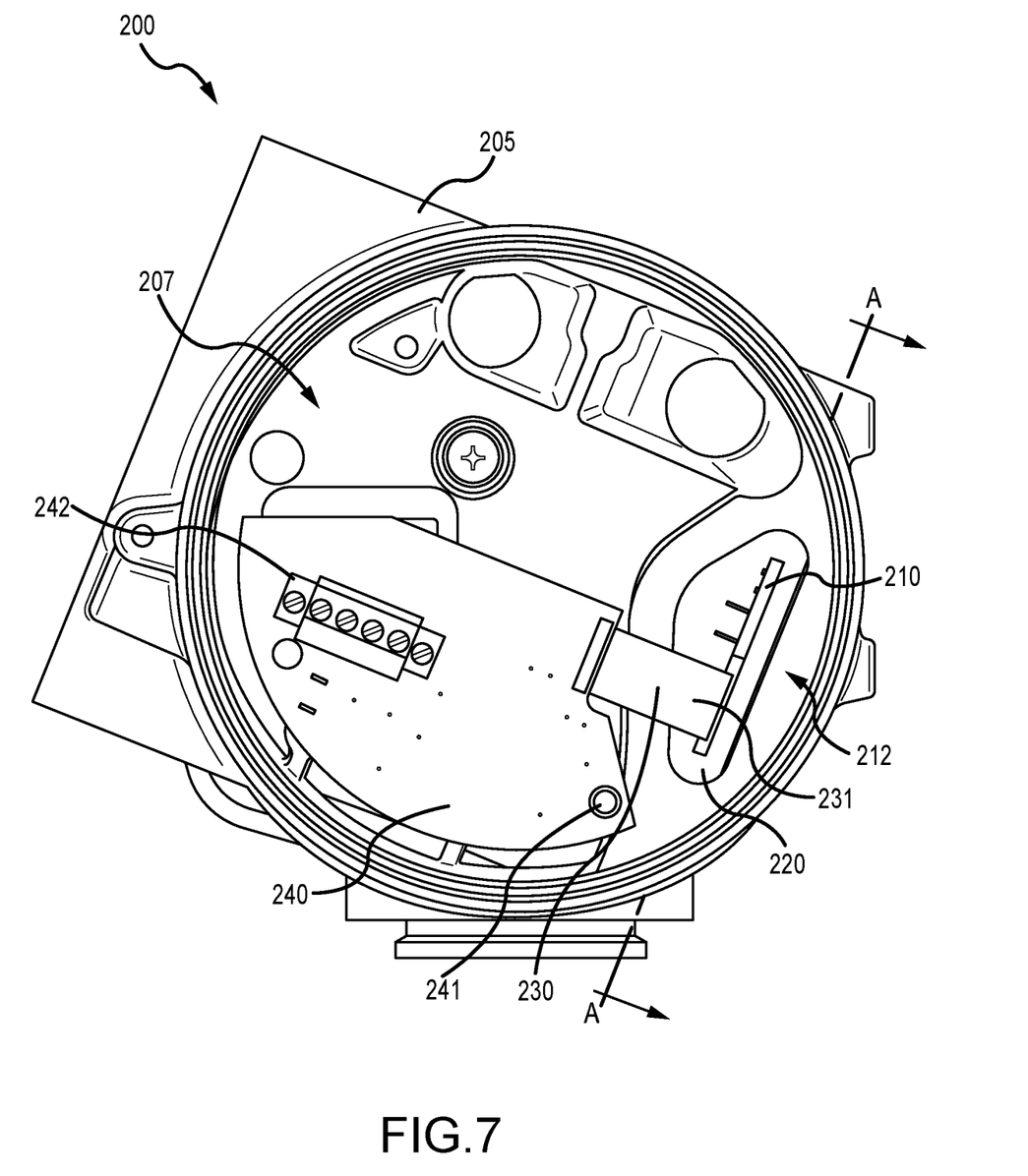
FIG. 7 illustrates a side view of the EMI resistant electronics enclosure of FIGS. 2-5.
Figure 8:
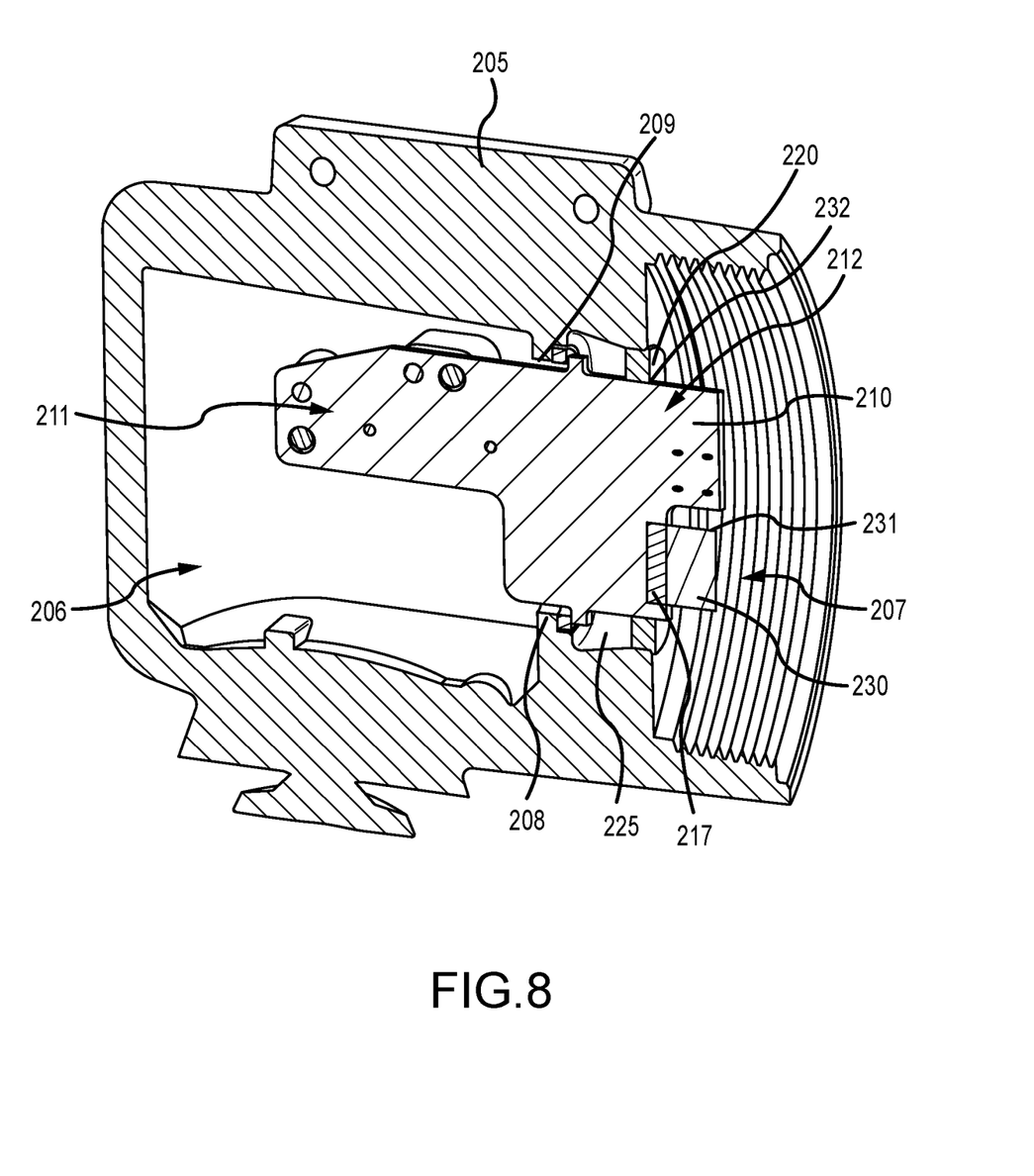
FIG. 8 illustrates a cross-sectional view of an embodiment of an EMI resistant electronics enclosure.

Turning particularly to FIG. 8, which is cross-section "A" of FIG. 7, a septum 208 separates the first compartment 206 and a second compartment 207. An aperture 209 between the first interface region 211 and the second interface region 212 allows communication between the first compartment 206 and a second compartment 207. The aperture 209 may comprise an aperture in a barrier, wall, the septum, or any other partition between the first compartment 206 and the second compartment 207.

The interface regions 211, 212 may include, define, or receive an electrical connector or other electrical component.

The first interface region 211 of the feed-through element 210 extends at least partially to the first compartment 206 of the electronics enclosure 200. The second interface region 212 of the feed-through element 210 extends at least partially to the second compartment 207 of the electronics enclosure 200.

The feed-through element 210 may comprise a substantially planar shape in some embodiments. However, the feed-through element 210 may be formed in any desired or needed shape. In some embodiments, the second interface region 212 may be substantially opposite the first interface region 211. However, this is not required and the second interface region 212 may be at any position/orientation with respect to the first interface region 211.

The feed-through element 210 includes one or more primary conductors 217 extending from the first interface region 211 to the second interface region 212. The one or more primary conductors 217 may comprise external conductors formed on an outer surface of the feed-through element 210. Alternatively, the one or more primary conductors 217 may comprise one or more internal conductors formed partially or completely within the feed-through element 210. The one or more primary conductors 217 may conduct electricity and/or electrical signals between the first interface region 211 and the second interface region 212.

The feed-through element 210 may comprise an electrical insulator material. The feed-through element 210 may comprise a non-flammable or flame or heat-resistant material. In some embodiments, the feed-through element 210 may comprise a printed circuit board (PCB). The one or more primary conductors 217 may be formed on outside surfaces of the feed-through element 210 or may be located partially or completely inside the feed-through element 210. The ends of the one or more primary conductors 217 at the first interface region 211 are exposed to be electrically contacted or coupled. Similarly, the ends of the one or more primary conductors 217 at the second interface region 212 are likewise exposed to be electrically contacted or coupled.

In some embodiments, the feed-through element 210 may be at least partially flexible. For example, in some embodiments the feed-through element 210 may comprise a flexible member that is similar to a ribbon cable.

A cavity 225 is disposed proximate the aperture 209. When the feed-through element 210 is installed in the electronics enclosure 200, the feed-through element 210 passes through the aperture 209 and the cavity 225. The cavity 225 thus opens to the aperture 209 and to the second compartment 207. The cavity 225 may be sealed by injecting a potting material therein, also surrounding and embedding the feed-through element 210 therein. The potting material prevents a spark, flame, or explosion from passing between the first and second compartments 206, 207.

In some embodiments, compliance with a flame proof standard may require maintaining a small gap, a long flame path length, or both. The flame path length may be selected so that a flame may not propagate from one side of the electronics enclosure 200 to the other side with sufficient heat or energy content to cause ignition, given a gap between the feed-through element 210 and the body 205.

In some embodiments, it is desired that gaps do not exist, as gaps may allow gasses to leak therethrough, and may allow possible gas ignition. Since gaps may allow ignition products to propagate through the joint, both the feed-through element 210 and aperture 209 may be smooth and regular, i.e., to within a predetermined surface finish.

Potting material is an epoxy, plastic, or other filling material which seals the cavity 225, thus preventing a flame or explosion from escaping through the cavity 225 or aperture 209.

As part of the assembly process, the feed-through element 210 is disposed in the aperture 209, such that the feed-through element 210 is inserted through the aperture 209 and the cavity 225, wherein the one or more primary conductors 217 extend between the first interface region 211 and the second interface region 212, and wherein the first interface region 211 resides in the first compartment 206, and the second interface region 212 resides in the second compartment 207. The potting material is then placed in the cavity 225, and takes the shape of the cavity 225, and is allowed to cure or harden. The feed-through element 210 is thus retained in the cavity 225 and the aperture 209 with the potting.

In an embodiment, the feed-through element 210 is inserted through the aperture 209 and the cavity 225 via the first compartment 206. In an embodiment, the feed-through element 210 is inserted through the aperture 209 and the cavity 225 via the second compartment 207.

In an embodiment, the feed-through element 210 may be machined to a predetermined profile tolerance, wherein the junction between the feed-through element 210 and the aperture 209 mates with sufficient precision to create a substantially explosion proof interface. For example, the feed-through element 210 may be manufactured to be thicker than desired and then the feed-through element 210 may be planed, milled, etched, ground, or otherwise processed until the electronics enclosure 200 comprises a junction between the feed-through element 210 and the aperture 209 having a desired size and shape and desired uniformity. The feed-through element 210 and/or the aperture 209 may be manufactured to achieve one or more of a predetermined perimeter size, a predetermined perimeter shape, and/or a predetermined perimeter surface smoothness and/or uniformity. In an embodiment, the feed-through element 210 overlaps the aperture 209 completely on one of the sides of the aperture 209, with no portions of the aperture remaining uncovered, such that the feed-through element 210 acts as a stop to achieve a predetermined position in the aperture 209.

Figure 5:
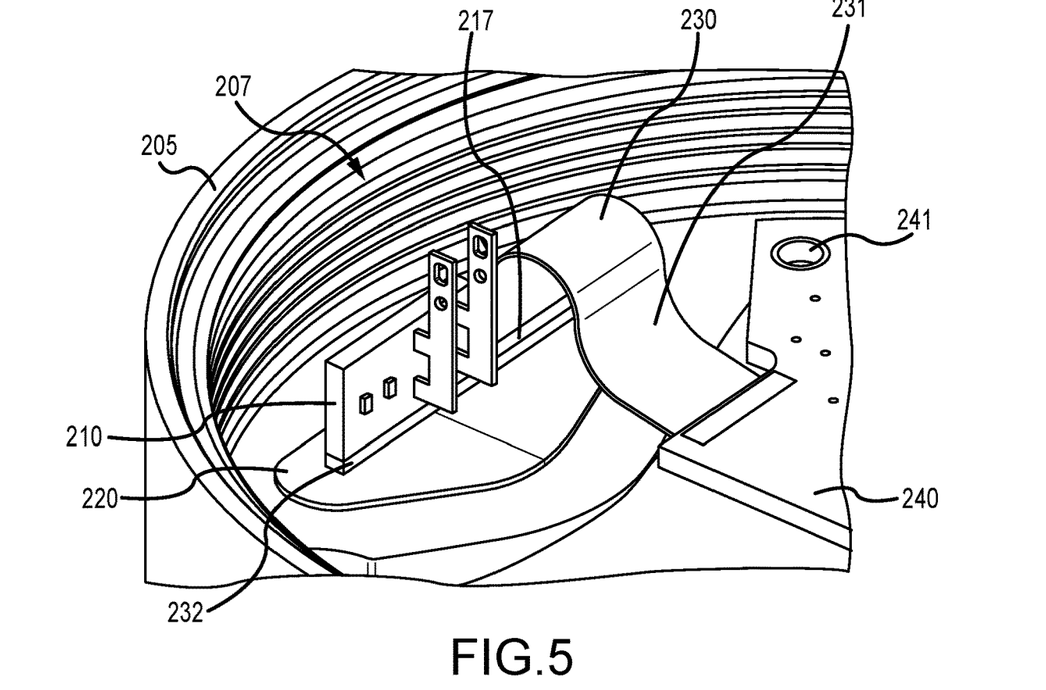
Figure 6:
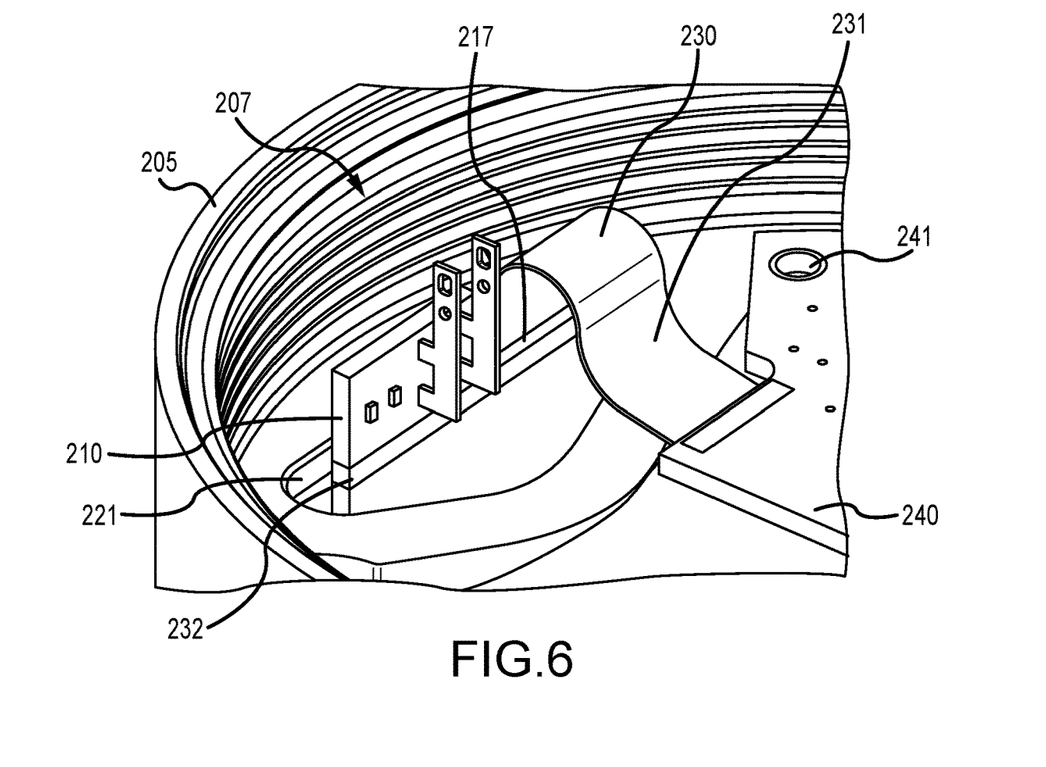
FIG. 6 illustrates the magnified isometric views of the EMI resistant electronics enclosure of FIG. 5 without a gasket installed.

In order to provide EMI shielding, a gasket 220 is provided. The gasket 220 is conductive, and provides a ground path. The gasket 220 contacts the body 205, which is grounded. The gasket 220 may be secured to the body 205 with an interference fit. In embodiments, the gasket 220 may be secured to the body 205 with fasteners and/or electrically conductive adhesives. FIG. 6 illustrates the body 205 with the gasket 220 not installed, while FIG. 5 illustrates the body 205 with the gasket 220 installed. In an embodiment, the gasket 200 abuts a case edge 221.

In an embodiment, the gasket 220 may be constructed having a relatively uniform composition. In an embodiment, the gasket 220 may be constructed having a core element with gap-filling capabilities which is either filled, sheathed, or coated with an electrically conductive element. The core element, may be foamed, un-foamed, solid, tubular, and may comprise an elastomeric thermoplastic material such as polyethylene, polyurethane, polypropylene, polyvinyl chloride, or a polypropylene-EPDM blend, or a thermoplastic or thermosetting rubber such as a butadiene, styrene-butadiene, nitrile, chlorosulfonate, neoprene, urethane, or silicone rubber, for example without limitation, as other compositions may be utilized. Conductive materials for the filler, sheathing, or coating include metal or metal-plated particles, conductive fabrics, conductive meshes, and conductive fibers. Metals may include copper, nickel, silver, aluminum, tin or an alloy such as Monel, with fibers and fabrics including natural or synthetic fibers such as cotton, wool, silk, cellulose, polyester, polyamide, nylon, and polyimide, for example without limitation. Alternatively, other conductive particles and fibers such as carbon, graphite, or conductive polymer materials may be utilized. In an embodiment, at least one layer of a conductive polyester fabric is provided that covers at least one layer of a core element.

In an embodiment, the primary conductors 217 electrically exit from the feed-through element 210 via a flexible member 230, such as a ribbon cable for example without limitation. The flexible member 230 comprises internal traces, wires, or other secondary conductors (not visible) that are in electrical communication with the primary conductors 217. An outer layer of the flexible member 230 comprises an EMI shield 231. The EMI shield 231 is a conductive layer. In an embodiment, the EMI shield 231 is grounded to the body 205. In an embodiment, the flexible member 230 connects to a secondary PCB 240. The secondary PCB is grounded to the body 205 at a conductive connection point 241. Furthermore, internal ground conductors (not visible) in the secondary PCB 240 provide electrical communication, and thus a ground path, between the conductive connection point 241 and the EMI shield 231 of the flexible member 230. Customer wiring terminals 242 are in electrical communication with the secondary conductors of the flexible member 230 via internal conductors of the secondary PCB (not visible), and these internal conductors are also shielded against EMI.

A conductive bar 232 is placed on the feed-through element 210. The conductive bar 232 is disposed 360° around the feed-through element 210. The conductive bar 232 thus creates a perimeter around the feed-through element 210. The conductive bar 232 is in electrical contact with the EMI shield 231 of the flexible member 230 and gasket 220. The conductive bar may be made from a metal, such as copper, gold, silver, platinum, or any other conductive material known in the art. The gasket 220 may be secured to the conductive bar 232 with an interference fit. In embodiments, the gasket 220 may be secured to the conductive bar 232 with fasteners and/or electrically conductive adhesives.

When the gasket 220 is installed, it contacts the conductive bar 232, such that the conductive bar 232 is in electrical contact with the gasket. Thus, a grounding path is created that extends from the housing 205, to the gasket 220, to the conductive bar 232, to the EMI shield 231, to the internal conductors in the secondary PCB 240, and to the body 205 again via the conductive connection point 241. Therefore, the conductors in the feed-through element 210 are fully surrounded by EMI shielding (i.e. the body 205) when in the first compartment 206, and still surrounded by EMI shielding in the second compartment 207, due to the gasket 220, conductive bar 232, and the EMI shield 231, since the EMI shield 231 surrounds the internal traces or wires of the flexible member 230, which are the electrical continuation of the conductors in the feed-through element 210. In sum, an EMI shield is created that is continuous from the housing 205, and extends from electronics internal to the first compartment 206 all the way to customer wiring terminals 242 that are in electrical communication with the primary conductors 217.

In an embodiment, the gasket is installed in the body 205, and the feed-through element 210 is installed therein. In another embodiment, the gasket is installed over the feed-through element 210, and these elements are subsequently installed in the body 205.

Overall, EMI shielding is thus provided that creates a 360° continuous shield around the PCB conductors, and is thus not dependent on customer wiring practices, yet still may maintain a flame proof or explosion proof electronics interface. In an embodiment, the EMI resistant electronics enclosure conforms to IEC 60079-1. In an embodiment, the EMI resistant electronics enclosure conforms to IEC 60079-1 (Ex-d) for the first compartment 206, and conforms to IEC 60079-7 (Ex-e) for the second compartment 207, thus allowing the second compartment's cap member 203 to be removable.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention. Accordingly, the scope of the invention should be determined from the following claims.

What is claimed is:

1. An EMI resistant electronics enclosure (200), comprising: a first compartment (206) defined by a body (205); a second compartment (207) defined by the body (205); a septum (208) between the first compartment (206) and the second compartment (207); a first aperture (209) with the septum (208) that connects the first compartment (206) and the second compartment (207); a feed-through element (210) comprising a first interface region (211) and a second interface region (212), wherein one or more primary conductors (217) extend between the first interface region (211) and the second interface region (212), and wherein the first interface region (211) resides in the first compartment (206), and the second interface region (212) resides in the second compartment (207); a conductive bar (232) that circumscribes at least a portion of the feed-through element (210); a conductive gasket (220) that extends from the body (205) to the conductive bar (232), wherein a ground path is formed between the body (205), the conductive bar (232) with the conductive gasket (220) and a flexible member (230) comprising secondary internal conductors that are in electrical communication with the primary conductors (217); an EMI shield (231) formed as an outer layer of the flexible member (230) that surrounds the secondary conductors of the flexible member (230).

2. The EMI resistant electronics enclosure (200) of claim 1, wherein the EMI shield (231) is in electrical contact with the conductive bar (232).

3. The EMI resistant electronics enclosure (200) of claim 1, wherein the EMI shield (231) is in electrical contact with a secondary PCB (240) disposed in the second compartment (207).

4. The EMI resistant electronics enclosure (200) of claim 3, wherein the secondary PCB (240) comprises a conductive connection point (241), and wherein the conductive connection point (241) is in electrical contact with the EMI shield (231).

5. The EMI resistant electronics enclosure (200) of claim 4, wherein the conductive connection point (241) is grounded.

6. The EMI resistant electronics enclosure (200) of claim 1, wherein the feed-through element (210) comprises a printed circuit board.

7. The EMI resistant electronics enclosure (200) of claim 1, wherein the gasket (220) comprises a conductive fabric.

8. A method of forming an EMI resistant electronics enclosure (200), with the method comprising: providing a body (205) comprising a first compartment (206) and a second compartment (207); separating the first compartment (206) and the second compartment (207) with a septum (208); placing a first aperture (209) in the septum (208) that connects the first compartment (206) and the second compartment (207); inserting a feed-through element (210) through the first aperture (209) and cavity (225), wherein the feed-through element (210) comprises a first interface region (211) and a second interface region (212), wherein one or more primary conductors (217) extend between the first interface region (211) and the second interface region (212), and wherein the first interface region (211) resides in the first compartment (206), and the second interface region (212) resides in the second compartment (207); placing a conductive bar (232) around at least a portion of the feed-through element (210); installing a conductive gasket (220) between the body (205) and the conductive bar (232), to form a conductive path therebetween and electrically connecting secondary internal conductors of a flexible member (230) to the primary conductors (217); and surrounding the secondary conductors of the flexible member (230) with an EMI shield (231).

9. The method of forming an EMI resistant electronics enclosure (200) of claim 8, wherein the feed-through element (210) comprises a printed circuit board.

10. The method of forming an EMI resistant electronics enclosure (200) of claim 8, wherein the gasket (220) comprises a conductive fabric.

11. The method of forming an EMI resistant electronics enclosure (200) of claim 8, comprising the step of placing the EMI shield (231) in electrical contact with the conductive bar (232).

12. The method of forming an EMI resistant electronics enclosure (200) of claim 8, comprising the step of electrically connecting the EMI shield (231) with a secondary PCB (240) disposed in the second compartment (207).

13. The method of forming an EMI resistant electronics enclosure (200) of claim 12, comprising the step of placing a conductive connection point (241) of the secondary PCB (240) in electrical contact with the EMI shield (231).

* * * * *

UNITED STATES PATENT AND TRADEMARK OFFICE
CERTIFICATE OF CORRECTION

| | | |
|---|---|---|
| PATENT NO. | : 11,913,819 B2 | Page 1 of 1 |
| APPLICATION NO. | : 17/265966 | |
| DATED | : February 27, 2024 | |
| INVENTOR(S) | : Brian T. Smith et al. | |

It is certified that error appears in the above-identified patent and that said Letters Patent is hereby corrected as shown below:

In the Specification

Column 1, Line 49, the equation should appear as follows:
$$\lambda = c / f \qquad (1)$$

Column 1, Line 51, replace "Ξ is the wavelength;" with --$\lambda$ is the wavelength;--

Signed and Sealed this
Sixteenth Day of September, 2025

Coke Morgan Stewart
*Acting Director of the United States Patent and Trademark Office*